Feb. 10, 1942.  A. H. ORGAN  2,272,575
WHEEL MOUNTING FOR MOTOR VEHICLES
Filed April 24, 1940  2 Sheets-Sheet 1
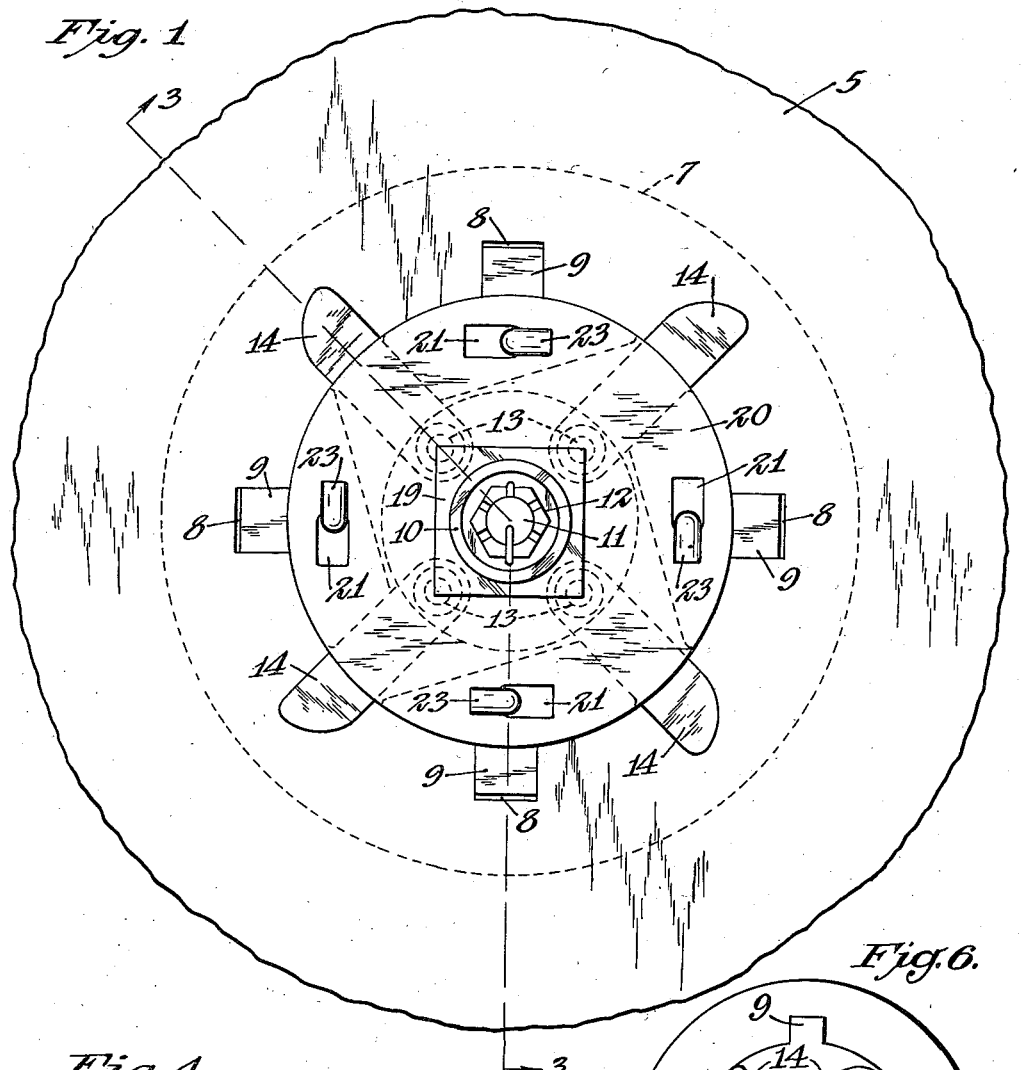
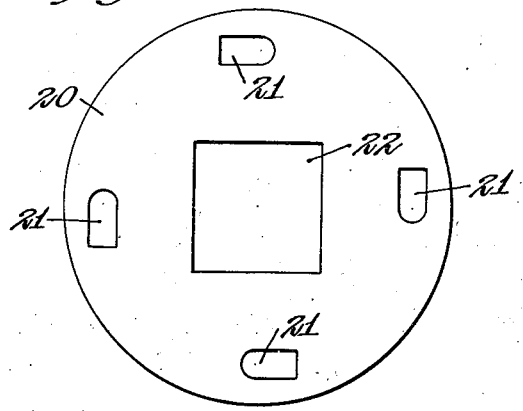
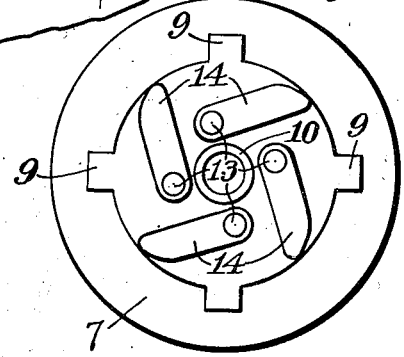
Inventor
Arthur H. Organ
By Williamson & Williamson
Attorneys Feb. 10, 1942.   A. H. ORGAN   2,272,575
WHEEL MOUNTING FOR MOTOR VEHICLES
Filed April 24, 1940   2 Sheets-Sheet 2
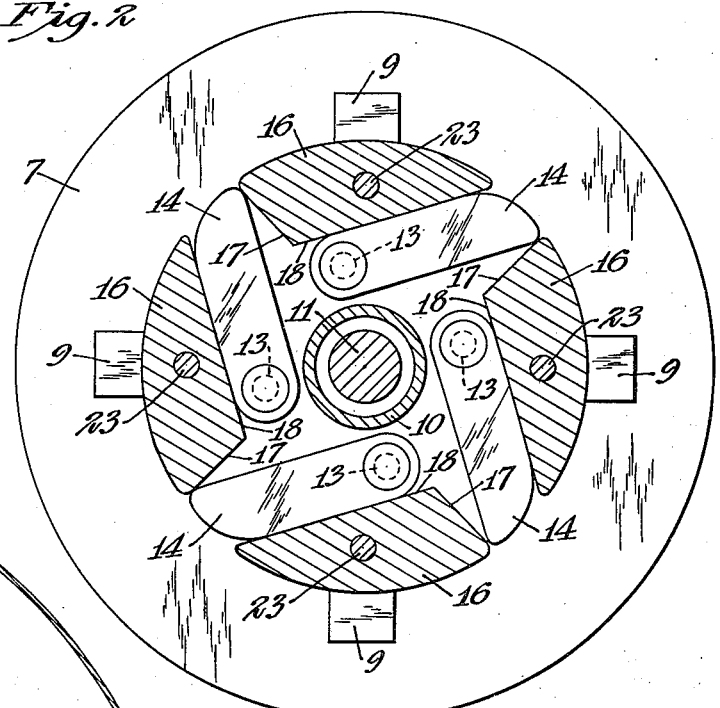
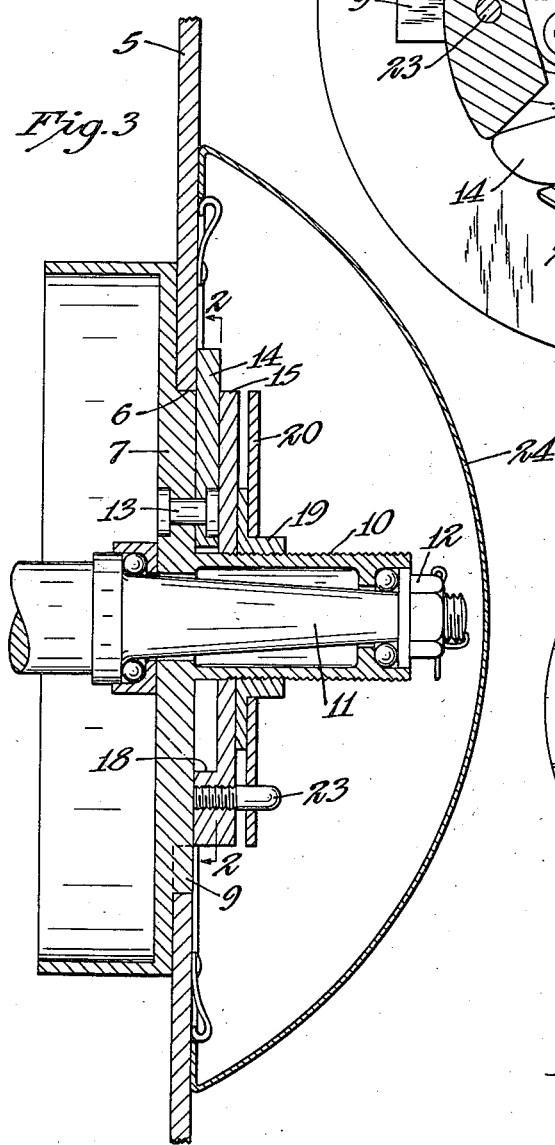
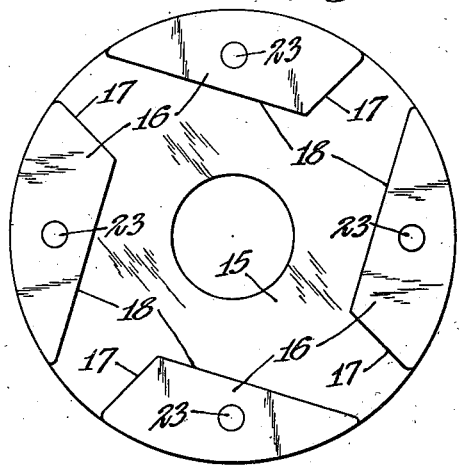
Inventor
Arthur H. Organ
By Williamson & Williamson
Attorneys Patented Feb. 10, 1942

2,272,575

UNITED STATES PATENT OFFICE 2,272,575

WHEEL MOUNTING FOR MOTOR VEHICLES

Arthur H. Organ, Minneapolis, Minn., assignor of one-fourth to James G. Kishish, Minneapolis, Minn.

Application April 24, 1940, Serial No. 331,376

4 Claims. (Cl. 301—9)

This invention relates to wheel mountings for vehicles and is particularly adapted for use as a quick operating mounting for motor vehicles in place of the usual plurality of hub nuts which must be individually tightened and loosened in mounting and dismounting the wheel.

One of the objects of my invention is to provide a wheel mounting wherein a single connector unit made up of a plurality of cam operated pivoted dogs is utilized to engage a wheel disc adjacent the hub against a side of said disc to firmly clamp the disc to the hub and wherein the clamping unit can be quickly and easily released and tightened.

Another object of the invention is to provide means for adjusting the clamping unit so that it will remain tight at all times even though a certain amount of wear might eventually take place.

A further object of the invention is to provide means for securing the pivot dogs which engage the wheel disc in such a manner that no appreciable amount of strain is placed upon said dogs.

Still another object of the invention is to provide means in combination with the clamping means for preventing relative rotation between the hub unit and the wheel disc in such a manner that the hub unit and disc are interlocked and unlocked without consuming any additional time in the mounting and dismounting of the wheel.

A further object of the invention is to provide positive locking means for preventing accidental displacement of the pivoted dogs which engage a face of the wheel disc.

These and other objects and advantages of the invention will more fully appear from the following description made in connection with the accompanying drawings, wherein like reference characters refer to the same parts throughout the views, and, in which:

Fig. 1 is a side elevation of an embodiment of my invention with the outer portions of the wheel disc broken away and with the hub cap or cover plate removed;

Fig. 2 is a section taken on the line 2—2 of Fig. 3;

Fig. 3 is a vertical section on line 3—3 of Fig. 1;

Fig. 4 is a view of the safety locking disc;

Fig. 5 is a view of the inside of the cam unit; and,

Fig. 6 is a reduced plan view of the hub plate.

In the drawings there is illustrated a wheel disc 5 which may constitute only the central portion of the wheel surrounding the hub or may be a full disc wheel as is well known in the art. The wheel disc is provided with a relatively large central aperture, as best shown in Fig. 3, and this aperture is adapted to receive the shouldered portion 6 of the hub plate 7. The shouldered hub plate has a plurality of detents 8 formed therein to receive lugs 9 which are preferably formed integrally with the hub plate 7. Extending outwardly from the central portion of the hub plate is a hub 10 adapted to receive the end of a conventional axle 11 which is secured by a nut 12 threaded on the end of said axle.

The hub plate 7 carries a plurality of pivot pins 13 which pivotally connect a plurality of dogs 14 to the plate and, as best shown in Fig. 3, the dogs are adapted to swing outwardly to engage the outer face of the wheel disc 5 at substantially equal spaced points around the aperture in said wheel disc. The opposite or inner face of the disc 5 abuts against the outer portions of the hub plate 7 so that the wheel disc is clamped between said plate and the dogs 14. A cam plate 15 is rotatably mounted on the hub 10 and on its inner face is provided with a plurality of cams 16 which have short side faces 17 and long side faces 18. As best shown in Fig. 2, there is a cam provided for each of the pivoted dogs 14, and when the cam plate 15 with its cams 16 is partially rotated in a counterclockwise direction the short cam faces 17 will bear against the sides of adjacent dogs and cause them to swing outwardly to the substantially radial position best indicated in Fig. 1. When the cam plate and cams are partially rotated in a reverse or clockwise direction the longer cam faces 18 will bear against the sides of those dogs lying ahead of them and cause the dogs to be retracted to the position shown in Fig. 2. Threaded on the hub 10 is a flanged nut 19 which is adapted to bear against the outer face of the cam plate 15, and when this nut is tightened with the dogs 15 extended said dogs will be pressed tightly against the outer face of the wheel disc 5. In order to lock the nut 18 with respect to the cam plate 15 I provide a lock element 20 which is illustrated separately in Fig. 4. This lock element is in the form of a relatively thin disc having a plurality of openings 21 formed at spaced points around its outer edge portion and a central squared opening 22. The locking element 20 is adapted to fit over the hub 10 and relatively closely fit the squared portion of the nut 19 and also overlies the flange on said nut. The smaller openings 21 in the locking element 20 are adapted to receive pins 23 which extend through said openings and can be swung so that their turned-over outer ends will lie over portions of said locking element 20. Thus the member 20 cannot be slipped off of the nut 19 and the nut is held against rotation relative to the cam plate 15. There is no twisting strain imparted on the dogs 14 and their operating cam plate and cams form the wheel disc 5 in view of the fact that the lugs 9 on the hub disc 7 engage the detents 8 in the wheel disc to receive all of the torsional strain between the axle and wheel disc.

It will be seen that I have provided a wheel mounting which is relatively simple in structure and can be operated for mounting or dismounting a wheel in a very short time and which at the same time provides a rigid and firmly held structure which will positively retain the wheel and which cannot accidentally become loosened. When it is desired to dismount a wheel, first, of course, the outer cover plate 24 is snapped off as is usual in the conventional wheel structure. The locking member 20 is then slipped off the hub after the retaining pins 23 have been registered with the slot 21 in said locking member. The nut 19 is then loosened slightly and the cam plate 15 with its cams is rotated approximately a quarter of an inch to pull the dogs 14 inwardly within the cam unit, as shown in Fig. 2. The wheel disc 5 can then be slipped off of the hub assembly and cam and dog unit. Naturally, the method of assembly is the reverse of the above described dismounting operation and can be accomplished with equal ease and speed.

Attention is called to the fact that when the wheel is mounted and the dogs 14 have been projected to engage the outer face of the wheel disc 5, the nut 19 can be turned slightly to tighten the same against the cam plate 15 and cause said plate to press the dogs 14 firmly against the wheel disc. This arrangement provides for the taking up of any slight wear which might occur and tightly ties all the elements of the assembly together so there is no relative movement and rattle. Furthermore, it will be seen in Figs. 1 and 3 that with the dogs 14 projected the cam plate 15 overlies them throughout all but their outer end portions, and for that reason the dogs are not subjected to any great strains which might otherwise be imposed by the wheel disc 5.

It will, of course, be understood that various changes may be made in the form, details, arrangement and proportions of the various parts without departing from the scope of my invention.

What is claimed is:

1. In a wheel structure, an apertured wheel disc, a hub plate closely fitted into the aperture in said disc and having a shoulder on one side thereof abutting one side of said disc, a rigid interlock between said disc and hub plate, a plurality of dogs connected to said hub plate on the side opposite to said shoulder and pivotally movable in a plane parallel to the face of said disc and into contact with said opposite side of said disc, means for swinging said dogs, and means for releasibly locking said operating means and dogs.

2. The structure in claim 1 and a hub extending outwardly from said hub plate and said dog operating means being rotatably mounted on said hub.

3. The structure in claim 1 and said means for releasibly locking said operating means and dogs comprising a nut threaded on said hub and adapted to clamp said dogs tightly against a face of said wheel disc.

4. In a wheel structure, an apertured wheel disc, a hub plate fitted into the aperture in said disc and having a shoulder on one side thereof abutting one side of said disc, a hub extending outwardly from said plate through the other side of said disc, a plurality of dogs pivotally mounted on said hub plate and swingable outwardly in a plane parallel to that of said disc and into engagement with the opposite side of said wheel disc from said hub plate shoulder, a cam plate rotatably mounted on said hub and having cam elements in engagement with said dogs, whereby rotation of said cam plate will swing said dogs outwardly at one side of said wheel disc, and a nut threaded on said hub on the outer side of and bearing against, whereby tightening of said nut will press said cam plate against said cams and said cams against the side of said wheel disc.

ARTHUR H. ORGAN.